United States Patent [19]

Pease

[11] 4,112,585
[45] Sep. 12, 1978

[54] LEVEL INDICATING INSTRUMENT

[75] Inventor: William Thomas Pease, Melbourne, Fla.

[73] Assignee: Alproco, Inc., Melbourne, Fla.

[21] Appl. No.: 766,443

[22] Filed: Feb. 7, 1977

[51] Int. Cl.² .............................................. G01C 9/28
[52] U.S. Cl. ........................................ 33/388; 33/390
[58] Field of Search ................. 33/340, 341, 343, 349, 33/370–373, 384–388, 390

[56] References Cited

U.S. PATENT DOCUMENTS

| 521,306 | 6/1894 | Campbell | 33/370 X |
|---|---|---|---|
| 1,063,342 | 6/1913 | Ekman | 33/385 X |
| 2,074,108 | 3/1937 | Graham | 33/386 X |
| 2,659,975 | 11/1953 | Van Gundy | 33/343 X |
| 3,173,211 | 3/1965 | Williams | 33/341 X |
| 3,728,796 | 4/1973 | Lobaugh | 33/343 |

FOREIGN PATENT DOCUMENTS 611,891 6/1933 Fed. Rep. of Germany ............ 33/371

Primary Examiner—Charles E. Phillips

[57] ABSTRACT

A level indicating instrument permitting simultaneous reading in two horizontal and/or vertical planes, one of which planes may be preset to any desired deviation from the horizontal. A pair of straight-edges perpendicular to each other along their long axis are coupled to a bubble indicator of the bull's-eye type. The bubble indicator may be rotated relative to the straight edges and set to indicate vertically or horizontally or any desired preset angle between vertical and horizontal.

9 Claims, 4 Drawing Figures

LEVEL INDICATING INSTRUMENT

BACKGROUND OF THE INVENTION

Level indicating instruments are widely used in the various construction and related trades. Most commonly used are straight edge types using a curved tube type bubble indicator or indicators and capable or reading either vertical or horizontal surfaces in one plane and in some cases an additional curved tube bubble indicator for 45° angles from the horizontal.

The disadvantages in the available devices lie in the multiple readings which must be taken to plumb a vertical member such as a stud, door frame, or pipe, alternating readings on separate sides of the member at locations substantially 90° from each other. In addition, no flexibility is provided in available instruments for such tasks as installing drain pipes and lines and roof-mounted rain gutters which must slope at a predetermined angle from the horizontal for optimum performance.

In other instances, it is desirable to level an object which is above the eye level of the operator. With presently available instruments, the level indicator must be viewed from a position horizontal to, or above the level indicating tube.

SUMMARY OF THE INVENTION

The above disadvantages and others which are evident to trade craftsmen are overcome by the present invention which employs novel features in both components and construction.

A pair of straight edge surfaces are employed fixed to each other in a perpendicular relationship along their long axes. A transparent bull's-eye bubble indicator provided with calibrated markings is fixed in a mounting tube. The bubble mounting member is rotatably attached to a suitable support base on the pair of straight edges and spring biased to the mounting point so that it may be rotated and fixed at any angle from the horizontal relative to the straight edges to provide the desired reading configurations.

The bubble may be viewed from either above or below through the bottom of the mounting tube and the pair of straight surfaces may be placed against a pipe, stud or similar object to align the item in one operation.

DESCRIPTION OF THE PREFERRED EMBODIMENTS

Figure 1:
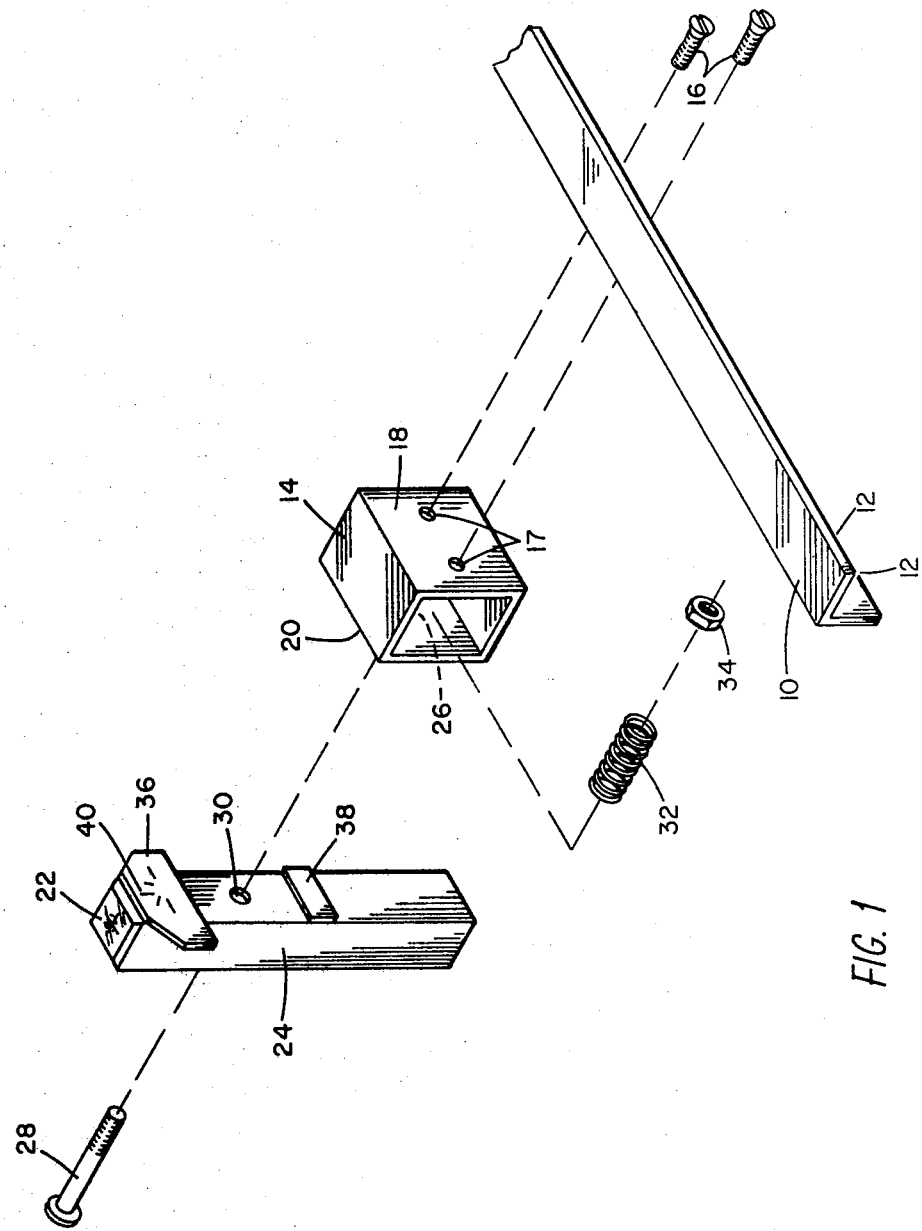
FIG. 1 is an exploded perspective view of the present instrument, illustrating a preferred method of construction.

As illustrated in FIG. 1, an angle bar 10 comprises a pair of straight edge members 12 joined together along their long axis in sustantially perpendicular relationship to each other.

A support base 14 preferably formed from a hollow extrusion of rectangular cross section is securely attached to the angle bar 10 by means of screws 16 or other suitable fastening means. The screws 16 pass through apertures 17 in one face 18 of the base 14 and mating apertures (not shown) in the adjacent member 12.

The support base 14 preferably is of square configuration on opposite mounting faces 18 and 20, and one of the edges of the mounting face 18 is disposed in substantially parallel relation to the adjacent straight edge member 12.

A bulls-eye type bubble indicator 22, preferably formed of a transparent plastic or similar material with suitable calibration markings on its viewing face, is mounted in or on one end of a mounting tube 24 preferably formed from a hollow tube of a substantially square cross section.

The mounting tube 24 is rotatably mounted to the support base 14 through a hole 26 in the center portion of the mounting face 20 of the base 14. A mounting bolt 28 passes through a close-fitting hole 30 in the mounting tube 24 and through the hole 26 in the mounting face 20, and is secured by means of a biasing spring 32 and self-locking nut 34 disposed within the support base 14. One face of the mounting tube 24 is thus held in sliding contact with mounting face 20. Any other suitable means may be used to rotatably connect the mounting tube 24 to the base 14.

Guide plates 36 and 38 are attached to the mounting tube 24 with their facing edges in substantially parallel and spaced apart relation to allow them to releasably interlock closely with the adjacent opposite edges of the square mounting face 20.

Calibrated angle indicating marks 40 of any suitable type preferably are provided on the upper guide plate 36, as shown in FIG. 1.

In operation, the mounting tube 24 is positioned on the support base 14 by means of the guide plates 36 and 38 and releasably held in position by the biasing spring 32 to provide level indications vertically or horizontally. In the case of a square-edged object such as a framing stud, the angle bar 10 may be placed over a corner of the object and simultaneous readings on two axis may be obtained.

When leveling a curved object such as a pipe, the angle bar 10, when placed against the object, automatically aligns itself exactly to the long axis and allows vertical alignment along all planes in one operation.

A corner of the support base 14 may be used in conjunction with the angle indicating marks 40 on the guide plate 36 to set the angle bar 10 at any desired angle for alignment of items such as sloping drain lines. The angle bar 10 and base 14 may be rotated relative to the mounting tube 24 by pulling the tube 24 away from the base 14 against the force of the spring 32 which enables the base 14 to clear the guide plates 36 and 38.

Figure 4:
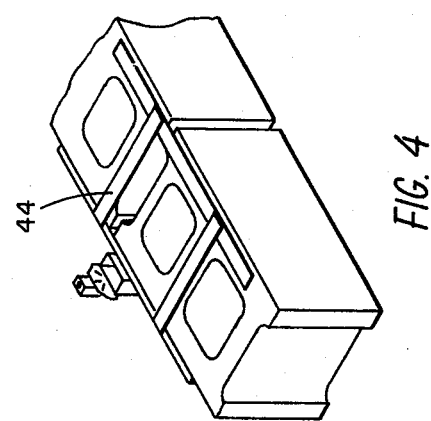
FIG. 4 is a perspective view of a second modified form of the instrument of the present invention.
Figure 3:
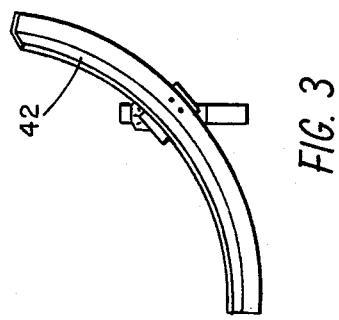
FIG. 3 is a perspective view of a first modified form of the instrument of the present invention.
Figure 2:
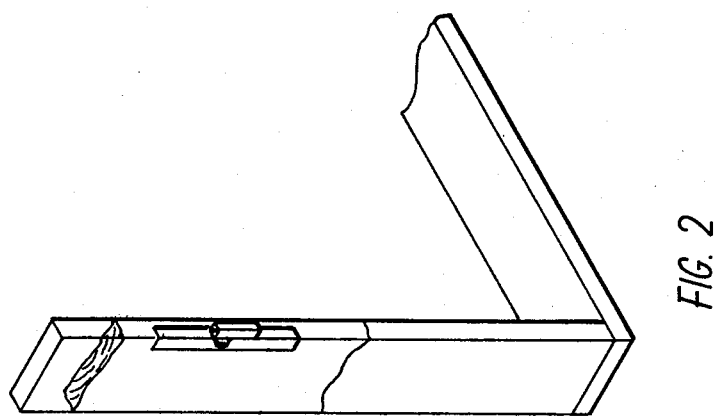
FIG. 2 is a perspective view of the instrument illustrating one mode of employment.

As illustrated in FIGS. 3 and 4, various configurations of angle bars 42 and 44, respectively, may be interchanged on the support base 14 for performing alignment of items such as soil pipe elbows (FIG. 3) or cement block walls (FIG. 4).

What is claimed is:
1. A level indicating instrument, comprising:
an angle bar having a pair of elongated members joined together along adjacent longitudinal edges and disposed in predetermined angular relationship,
a support base secured to said angle bar,
a mounting member rotatably connected to said support base, level indicating means mounted on said mounting member, said mounting member having angle indicating means provided on a portion thereof disposed adjacent to said support base, and having spaced guide plates positioned to engage with opposite portions of said support base to releasably retain said mounting member and said support base in a predetermined angular relationship.

2. The instrument of claim 1 wherein said elongated members are disposed in substantially perpendicular relation.

3. The instrument of claim 1 wherein said level indicating means comprises a bubble indicator.

4. The instrument of claim 1 wherein spring means are provided to urge said mounting member toward said base to releasably retain said mounting member in a selected angular position relative to said base, said mounting member being movable away from said base against the force of said spring means to move said guide plates away from said base to enable relative rotation of said mounting member and said base.

5. The instrument of claim 1 wherein said elongated members are straight edge members.

6. The instrument of claim 1 wherein said elongated members are curved.

7. The level indicating instrument of claim 1 wherein said support base is provided with a substantially flat face, and said mounting member is provided with a substantially flat face disposed adjacent to and engagable with said support base face.

8. The level indicating instrument of claim 1 wherein said angle indicating means is provided on one of said guide plates, and a portion of said support base is engagable with said one guide plate to indicate the angle of said angle bar relative thereto.

9. The level indicating instrument of claim 1 wherein said mounting member and said support base each comprise a tubular section.

* * * * *